United States Patent [19]

Meyers et al.

[11] Patent Number: 4,630,391
[45] Date of Patent: Dec. 23, 1986

[54] RODENT TRAP

[76] Inventors: Arthur Meyers, 151 E. Palmetto Park Rd., Boca Raton, Fla. 33432; Albert DeSantis, 1935 - 55 NW. 55th Ave., Margate, Fla. 33063

[21] Appl. No.: 835,162

[22] Filed: Mar. 3, 1986

[51] Int. Cl.[4] ............................................. A01M 1/10
[52] U.S. Cl. ........................................... 43/58; 43/88
[58] Field of Search ................... 43/60, 67, 58, 88, 89

[56] References Cited

U.S. PATENT DOCUMENTS

| 1,553,536 | 9/1925 | Irvine | 43/88 |
| 3,864,866 | 2/1975 | Kosinsky | 43/58 |
| 3,918,195 | 11/1975 | Benson | 43/88 |
| 4,438,584 | 3/1984 | Baker | 43/58 |

Primary Examiner—Gene P. Crosby

[57] ABSTRACT

A rodent trap having a pair of closure surfaces having a large ratio of surface area with reference to size of the rodent to be trapped. The closure surfaces are integrally joined by a flexible hinge defining a thin bending hinge between the first and second closure areas. The hinge operates to create an angulation relative to the floor of the first and second closure surfaces. The hinge is bridged by elastic bands which, in the absence of any pressure on the closure surfaces, maintains the closure surfaces at an angle relative to the floor. The application of the weight of a rodent at or near the hinge will press the hinge toward the floor thereby destabilizing the elastic bands and bringing about a rapid snap-like closure of the closure surfaces, completely enclosing and trapping the rodent.

6 Claims, 8 Drawing Figures

RODENT TRAP

BACKGROUND OF THE INVENTION

The present invention relates to improvements in animal traps and, more particularly, to a safe and sanitary means for trapping and disposing of rodents.

In the prior art, a difficulty with rodent traps has been that after the capture of the rodent, it was necessary to physically remove the rodent from the trap or otherwise to touch the trapped animal. This procedure is awkward, unsanitary and, to many people, renders the use of a mousetrap undesirable. It is, accordingly, an intent of the present invention to provide a means for trapping a rodent wherein the trapped animal will not be at all visible after the trap is closed and in which, the entire rodent trap can be disposed of together with the trapped animal.

The present rodent trap is, as well, safe with regard to both children and pets in that it does not have sharp edges whatsoever.

The prior art, as best known to the inventors, appears in U.S. Pat. No. 1,553,536 (1925) to Irvine entitled "Animal Trap." This reference lacks the simplicity of mechanical design needed to make its use feasible as a disposable rodent trap.

SUMMARY OF THE INVENTION

The present invention comprises a pair of closure surfaces having a large ratio of surface area to the size of the rodent to be trapped, said closure surfaces integrally joined by a hinge, said hinge defining a thin crease representing the line of communication between a first closure area and the second closure area. Said hinge serves to create an arch-like angulation, relative to the floor, of said first and second closure surfaces. Centrally disposed in the area of said hinge is a feeding area adapted to be the focus of the rodent's attention. Said transverse hinge between said first and second closure surfaces is bridged by elastic bands which, in the absence of any pressure on said closure surfaces, maintains said first and second closure surfaces at an angle relative to the floor upon which the rodent trap is placed such that the integral transverse hinge joining said first and second closure surfaces defines the highest point of the trap. Said angulation of said closure surfaces relative to the floor is maintained by the orientation of the elastic bands which extend over said transverse hinge. In the absence of any application of any pressure in the area of the feeding area, the rodent trap will remain as a stable, mechanical structure. However, when the feeding area is exposed to the weight of a rodent, said transverse hinge will be forced downward, thereby inducing an instability into the mechanical structure of said elastic bands and, more particularly, causing a shift in the point of mechanical stability of said elastic bands such that said first and second closure area will be whipped toward each other thereby completely trapping the rodent within said closure surfaces. Thereafter perimetric lips of said closed surfaces may be simply grasped and the enclosed, trapped animal simply discarded.

It is thereby seen that the principal object of the present invention is to provide a simple, sanitary, disposable rodent trap, and which, as well does not pose a safety hazard to children or pets.

It is a further object to provide a rodent trap of the above type which is sufficiently inexpensive in cost to be freely disposable even in very poor regions of the world.

The above and yet other objects of the invention will become apparent from the hereinafter described Detailed Description of the Invention, the Drawings, and the Claims appended herewith.

DETAILED DESCRIPTION OF THE INVENTION

Figure 1:
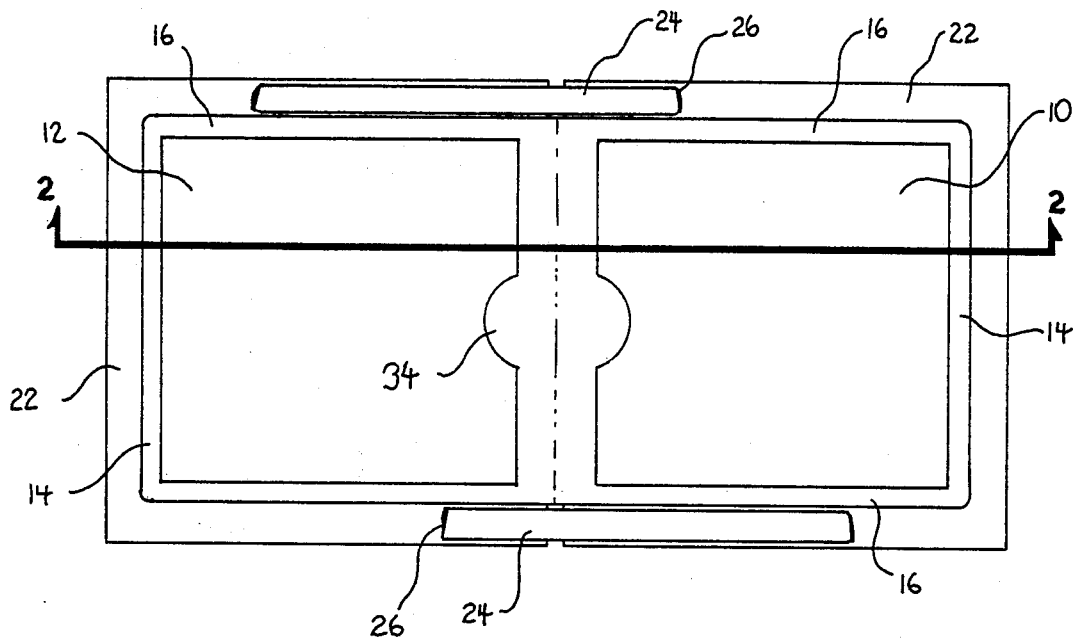
FIG. 1 is a top plan view of present inventive rodent trap.
Figure 7:
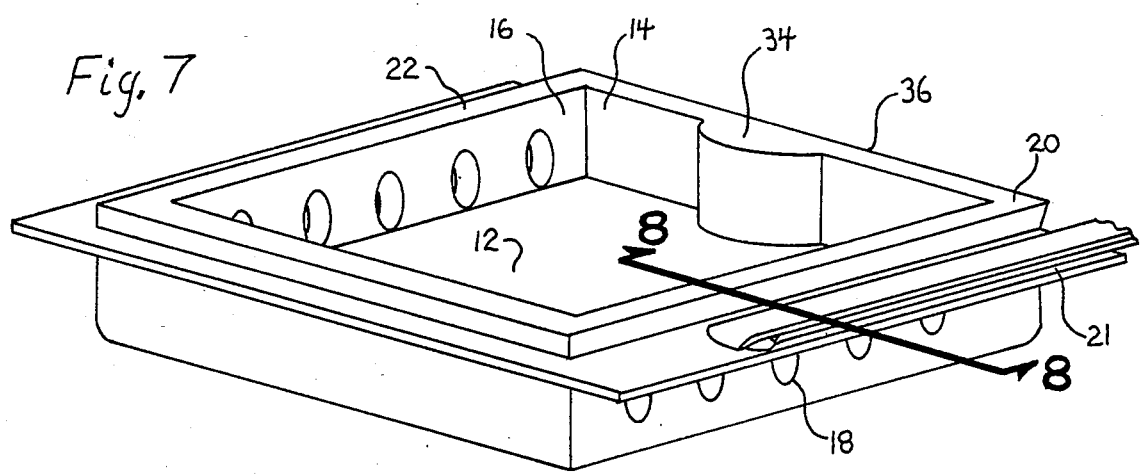
FIG. 7 is a top perspective view of one side of the trap.

With reference to the top plan view of FIG. 1 and the perspective view of FIG. 7 there is shown a first closure surface 10 and a second closure surface 12. The surfaces are provided with a material such as an adhesive which, among its other functions, will trap and hold insects which come into contact with said surfaces 10 and 12.

Closure surfaces 10 and 12 are surrounded on four sides by a wall structure comprising transverse sidewalls 14 and longitudinal sidewalls 16 (See FIG. 7) such that a large recessed floor is formed in each closure surface.

In longitudinal sidewalls 16 is disposed a plurality of air release holes 18 which permit the rodent trap to close more efficiently.

Figure 6:
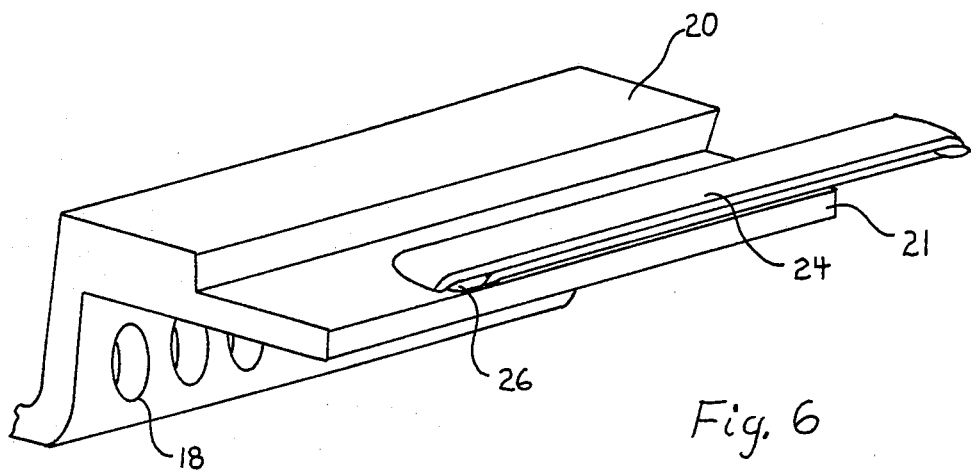
FIG. 6 is a perspective, fragmentary view of the lip structure.
Figure 8:
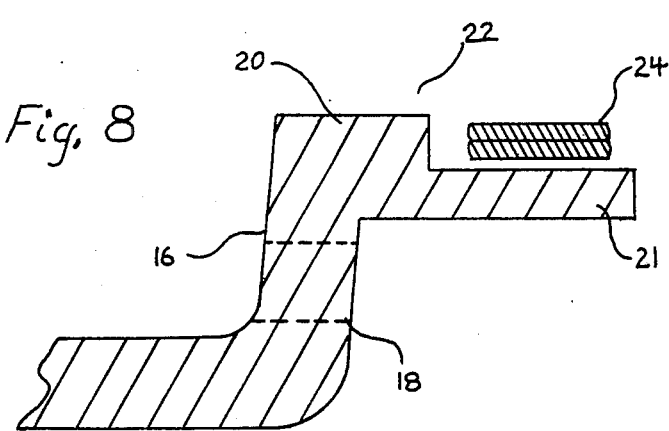
FIG. 8 is a cross-sectional view taken along Line 8—8 of FIG. 7.

Above said sidewalls 14 and 16 is a projecting horizontal lip 22 (See cross-sectional view of FIG. 8) which includes an inner region 20 and an outer region 21. See also the perspective view of FIG. 6.

Figure 3:
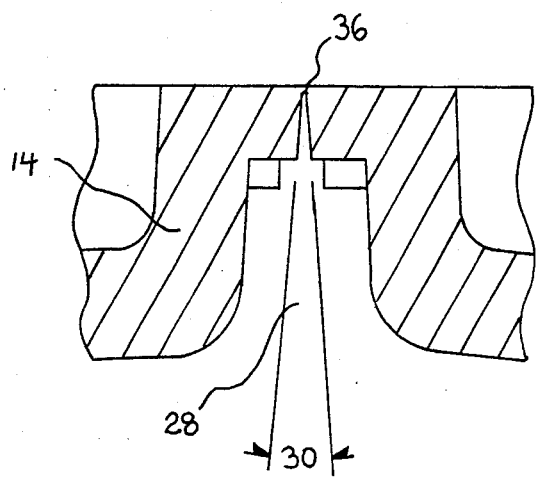
FIG. 3 is a detail of the flexible hinge of the invention taken from the area denoted as "Detail 3" of FIG. 2.
Figure 4:
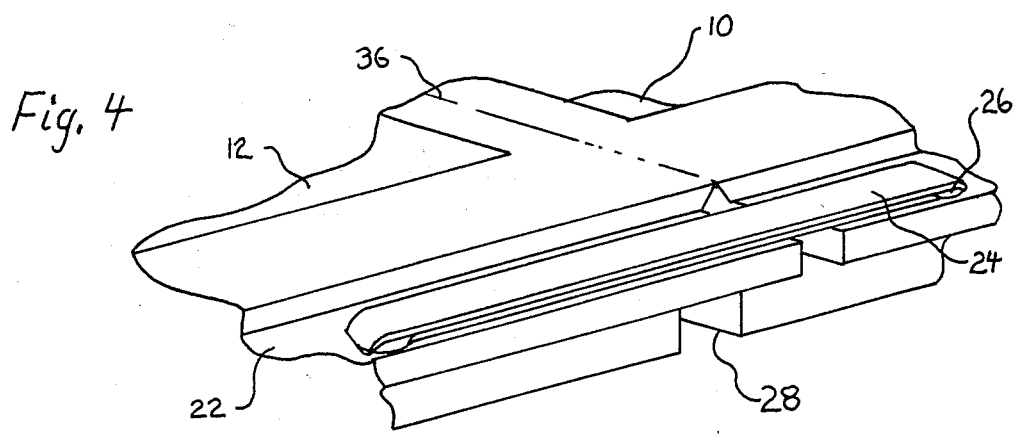
FIG. 4 is a diagonal perspective view of the segment of an area of the mouse trap taken in the area of the hinge.
Figure 5:
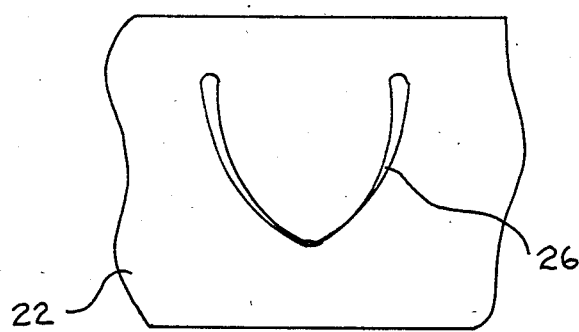
FIG. 5 is an enlarged view of the elastic band securing means.

On the outer region 21 of horizontal lip 22 is disposed securement element 26 which holds the end of elastic bands 24. With reference to the detailed view of FIG. 3, there is shown therein transverse flexible hinge 28, transverse crease 36, transverse sidewalls 14, and angle 30 which is defined by the angle between sidewalls 14 at the point of crease 36. Through experimentation, it has been found that angle 30 should be in the range of 1 to 10 degrees in order to properly tension elastic bands 24. In addition to the tensioning function, the geometry of hinge 28 (See FIG. 4) is such that, when a rodent approaches feeding area 34, vertical pressure upon the trap will be at a maximum. This pressure will be sufficient to cause transverse crease 38 to push downward opposing the elasticity of bands 24 (having elongation in a range of 300 percent at a pull of 2 to 3 lbs.) thereby causing the point of stability of bands 24 to rapidly shift from the position shown in cross-sectional view of FIG. 2 to a position in which closure surfaces 10 and 12 are whipped toward each other thereby trapping the rodent. By virtue of the horizontal lip 22, the entire assembly can be grasped and discarded, with the rodent enclosed therein. Said adhesive layer, which is also disposed in the lip structure, assures that the assembly will remain closed until it is discarded.

Figure 2:
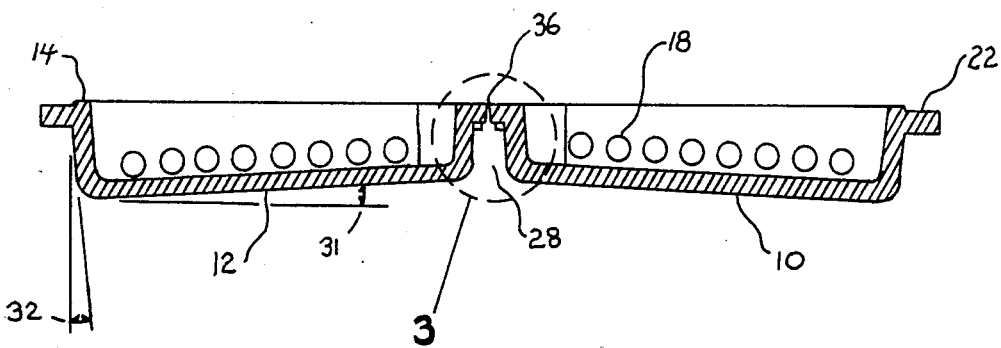
FIG. 2 is a cross-sectional view taken along Line 2—2 of FIG. 1.

With further reference to FIG. 2, there is shown angle 31 which constitutes the angle between the floor and closure surfaces 10 and 12. Shown as angle 32 is an angle between sidewalls 14 and the vertical. It is to be appreciated that a rodent touching outer portion 21 of projecting lip 22 will not bring about a "triggering" of the elastic band 24. Rather, the rodent will be able to step over lip 22 to feeding area 34 and, as above described, it is only upon the application of the weight of the rodent to area 34 that sufficient downward force will be concentrated upon crease 36 to bring about a stability shift of the elastic bands 34 and, thereby, the closure of surfaces 10 and 12 onto themselves.

Many polymeric plastics are suitable for use in constructing the present trap.

The insects attracted to an adhesive placed on surfaces 10 and 12 during the period prior to approach by a rodent will serve as a form of bait which, in addition to the food in feeding area 34, will attract the rodent to the trap.

While there has been shown and described the preferred embodiments of the present invention, it is to be understood the invention may be embodied otherwise than is herein illustrated and described and that in said embodiments, certain changes in the detailed construction, and in the form and arrangement of parts may be made without departing from the underlying idea or principles of this invention within the scope of the appended claims.

Having thus described our invention, as what we claim as new, useful and non-obvious, and, accordingly, secured by Letters Patent of the United States is:

1. a rodent trap comprising:
   (a) a first and second closure surface, each of said surfaces having an area substantially greater than the size of the rodent to be trapped, said first and second surfaces integrally connected through a thin, flexible hinge of material therebetween, each of said closure surfaces having a recessed central area comprising most of the surface area of said closure surfaces, said recessed central area having planar floors which define a mutual relative angle therebetween in the nature of an arch relative to the floor upon which said rodent trap is placed, each of said closure surfaces further comprising:
      (i) a feeding area within each of said recessed central areas, each of said feeding areas disposed proximately to said hinge joining said closure surfaces; and
      (ii) a perimetric lip structure, elevated with reference to the level of said recessed central areas, and formed integrally therewith, opposing faces of said lip structure both proximate to said integral hinge forming a mutually included angle therebetween comprising a part of said arch;
   (b) elastic means secured to said lip structure and disposed transversely to said flexible hinge and upon opposite sides of said closure surfaces, each of said elastic means extending over said flexible hinge to thereby stabilize said closure surfaces in said arch, whereby the application of the weight of a rodent on said feeding area will press said arch toward the floor thereby destabilizing said elastic means and thereby causing said closure surfaces to rapidly close upon each other and about the rodent.

2. The rodent trap as recited in claim 1 in which said closure surface is provided with an adhesive means to effect the capture of small insects prior to the closure of the trap and to assure a secure closure of the trap after it has closed.

3. The trap as recited in claim 1 in which said mutual included angle of said opposing areas of said perimetric lip structure is in the range of 1 degree to 10 degrees.

4. The trap as recited in claim 3 in which elongation property of said elastic means is approximately 300 percent at a force of about 2 pounds.

5. The trap as recited in claim 4 in which said elastic means comprises a rubber band.

6. The trap as recited in claim 3 in which the walls of said closure surfaces include a plurality of air pressure-relief holes to effect a more rapid rate of closure of the trap.

* * * * *